US012783871B2

(12) United States Patent
More

(10) Patent No.: US 12,783,871 B2
(45) Date of Patent: Nov. 3, 2026

(54) LEARNING APPARATUS, LEARNING METHOD AND STORAGE MEDIUM THAT ENABLE EXTRACTION OF ROBUST FEATURE FOR DOMAIN IN TARGET RECOGNITION

(71) Applicant: HONDA MOTOR CO., LTD., Tokyo (JP)

(72) Inventor: Amit popat More, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1274 days.

(21) Appl. No.: 17/665,032

(22) Filed: Feb. 4, 2022

(65) Prior Publication Data

US 2022/0261643 A1 Aug. 18, 2022

(30) Foreign Application Priority Data

Feb. 18, 2021 (JP) ................................ 2021-024370

(51) Int. Cl.
*G06N 3/045* (2023.01)
*G06N 3/08* (2023.01)
(Continued)

(52) U.S. Cl.
CPC ............... *G06N 3/08* (2013.01); *G06N 3/045* (2023.01); *G06V 10/7715* (2022.01); *G06V 10/82* (2022.01); *G06V 20/56* (2022.01)

(58) Field of Classification Search
CPC .......... G06N 3/08; G06N 3/045; G06N 3/084; G06V 10/7715; G06V 10/82; G06V 20/56; G06V 20/58
See application file for complete search history.

(56) References Cited

U.S. PATENT DOCUMENTS 10,304,137 B1 * 5/2019 Genser .................. G06Q 40/08
10,380,696 B1 * 8/2019 Haller, Jr. .......... G06Q 30/0283
(Continued)

FOREIGN PATENT DOCUMENTS

| | | | |
|---|---|---|---|
| CN | 111630530 | A | 9/2020 |
| CN | 111771216 | A | 10/2020 |
| CN | 112232184 | A | 1/2021 |

OTHER PUBLICATIONS

Chinese Office Action for Chinese Patent Application No. 202210066481.0 mailed Oct. 30, 2024 (partially translated).
(Continued)

*Primary Examiner* — Phenuel S Salomon
(74) *Attorney, Agent, or Firm* — THOMAS | HORSTEMEYER, LLP

(57) ABSTRACT

A learning apparatus executes processing of: a first neural network that extracts a first feature of a target in image data; a second neural network that extracts a second feature of the target in the image data using a network structure different from the first neural network; and a learning support neural network that extracts a third feature from the first feature extracted by the first neural network. Here, the second feature and the third feature are biased features for the target. The learning apparatus trains the learning support neural network so that the second feature and the third feature come closer, and trains the first neural network so that the third feature appearing in the first feature extracted by the first neural network is reduced.

13 Claims, 10 Drawing Sheets

(51) Int. Cl.

| | |
|---|---|
| ***G06V 10/77*** | (2022.01) |
| ***G06V 10/82*** | (2022.01) |
| ***G06V 20/56*** | (2022.01) |

(56) References Cited

U.S. PATENT DOCUMENTS

| | | | | |
|---|---|---|---|---|
| 10,430,876 | B1 | 10/2019 | Tang et al. | |
| 10,853,876 | B2 | 12/2020 | Tang et al. | |
| 11,308,357 | B2 | 4/2022 | Iwasaki | |
| 11,494,838 | B2 | 11/2022 | Tang et al. | |
| 11,538,286 | B2 * | 12/2022 | Zhang | G06V 10/82 |
| 11,663,663 | B2 | 5/2023 | Tang et al. | |
| 11,681,921 | B2 | 6/2023 | Oh et al. | |
| 2014/0081675 | A1 * | 3/2014 | Ives | G06Q 40/08 705/4 |
| 2015/0170287 | A1 * | 6/2015 | Tirone | G06Q 40/08 705/4 |
| 2017/0148102 | A1 * | 5/2017 | Franke | G06Q 10/1093 |
| 2017/0293894 | A1 * | 10/2017 | Taliwal | G06V 10/82 |
| 2019/0279293 | A1 | 9/2019 | Tang et al. | |
| 2019/0385230 | A1 | 12/2019 | Tang et al. | |
| 2020/0134427 | A1 | 4/2020 | Oh et al. | |
| 2020/0302233 | A1 | 9/2020 | Iwasaki | |
| 2020/0349444 | A1 | 11/2020 | Yaguchi | |
| 2020/0357196 | A1 * | 11/2020 | Zhang | G06F 18/253 |
| 2021/0012205 | A1 | 1/2021 | Ozaki | |
| 2021/0056623 | A1 | 2/2021 | Tang et al. | |
| 2021/0056753 | A1 * | 2/2021 | Yasar | G06V 20/176 |
| 2021/0133501 | A1 * | 5/2021 | Xu | G06V 30/274 |
| 2023/0073709 | A1 | 3/2023 | Tang et al. | |
| 2023/0281777 | A1 * | 9/2023 | Lenor | B60W 50/14 382/104 |
| 2023/0368544 | A1 * | 11/2023 | Narayan | G06V 20/56 |
| 2024/0037652 | A1 | 2/2024 | Tang et al. | |

OTHER PUBLICATIONS

Bahng et al., "Learning De-biased Representations with Biased Representations", arXiv: 1910.02806v2 [cs.CV], Mar. 2, 2020.

* cited by examiner

FIG. 4

| | LABEL | | |
|---|---|---|---|
| IMAGE ID | TARGET TYPE | CENTER POSITION OF TARGET (x, y) | SIZE OF TARGET (w, h) |
| XX0001 | TRUCK | (x1, y1) | (w1, h1) |
| XX0002 | PASSENGER VEHICLE | (x2, y2) | (w2, h2) |
| XX0003 | EXCAVATOR | (x3, y3) | (w3, h3) |
| ... | ... | ... | ... |

LEARNING APPARATUS, LEARNING METHOD AND STORAGE MEDIUM THAT ENABLE EXTRACTION OF ROBUST FEATURE FOR DOMAIN IN TARGET RECOGNITION

CROSS-REFERENCE TO RELATED APPLICATION(S)

This application claims priority to and the benefit of Japanese Patent Application No. 2021-024370 filed on Feb. 18, 2021, the entire disclosure of which is incorporated herein by reference.

BACKGROUND OF THE INVENTION

Field of the Invention

The present invention relates to a learning apparatus, a learning method and a storage medium that enable extraction of a robust feature for a domain in target recognition.

Description of the Related Art

In recent years, there has been known a technique for inputting an image captured by a camera to a deep neural network (DNN) and recognizing a target in the image on the basis of inference processing performed by the DNN.

In order to improve robustness of target recognition by a DNN, it is necessary to perform learning (training) by using a wide variety and number of data sets from different domains. Learning to be performed by use of a wide variety and number of data sets enables a DNN to extract a robust image feature not unique to a domain. However, it is often difficult to use such a method in terms of data collection cost and enormous processing cost.

Meanwhile, there has been studied a technique for training a DNN by use of a data set from a single domain and extracting a robust feature. For example, in a DNN for target recognition, learning may be performed in consideration of a feature (biased feature) different from a feature to be noticed, in addition to the feature to be noticed. In that case, when recognition processing is performed on new image data, there may be a case where a correct recognition result cannot be output (that is, a robust feature cannot be extracted) due to the influence of the biased feature.

In order to solve such a problem, Hyojin Bahng et al. ("Learning De-biased Representations with Biased Representations", arXiv: 1910.02806v2 [cs.CV], Mar. 2, 2020) (hereinafter, simply referred to as Hyojin) proposes a technique for extracting a biased feature (a texture feature in Hyojin) of an image by using a model (DNN) that facilitates extraction of a local feature in the image, and removing the biased feature from features of the image by using the Hilbert-Schmidt Independence Criterion (HSIC).

In the technique proposed by Hyojin, a specific model for extracting a texture feature is specified based on its design on the assumption that the biased feature is a texture feature. That is, Hyojin proposes a technique dedicated to a case where a texture feature is treated as a biased feature. Furthermore, in the technique proposed by Hyojin, the HSIC is used for removing a biased feature, and no other approaches to removal of a biased feature have been taken into consideration.

SUMMARY OF THE INVENTION

The present disclosure has been made in consideration of the aforementioned issues, and realizes a technique for enabling adaptive extraction of a robust feature for a domain in target recognition.

In order to solve the aforementioned problems, one aspect of the present disclosure provides a learning apparatus comprising: one or more processors; and a memory storing instructions which, when the instructions are executed by the one or more processors, cause the learning apparatus to execute processing of: a first neural network configured to extract a first feature of a target in image data; a second neural network configured to extract a second feature of the target in the image data using a network structure different from the first neural network; and a learning support neural network configured to extract a third feature from the first feature extracted by the first neural network, wherein the second feature and the third feature are biased features for the target, and the one or more processors causes the learning apparatus to train the learning support neural network so that the second feature extracted by the second neural network and the third feature extracted by the learning support neural network come closer, and train the first neural network so that the third feature appearing in the first feature extracted by the first neural network is reduced.

Another aspect of the present disclosure provides a learning apparatus comprising: one or more processors; and a memory storing instructions which, when the instructions are executed by the one or more processors, cause the learning apparatus to execute processing of: a first neural network, a second neural network, and a learning support neural network, wherein the first neural network is configured to extract a feature of image data from the image data, the second neural network comprising a smaller scale of network structure than the first neural network is configured to extract a feature of the image data from the image data, the learning support neural network is configured to extract a feature including a bias factor of the image data from the feature of the image data extracted by the first neural network, and wherein the one or more processors further cause the learning apparatus to compare the feature extracted from the second neural network with the feature including the bias factor extracted from the learning support neural network, and to output a loss.

Still another aspect of the present disclosure provides a learning apparatus comprising: one or more processors; and a memory storing instructions which, when the instructions are executed by the one or more processors, cause the learning apparatus to execute processing of: a first neural network configured to extract a feature of a target in image data and classify the target; a learning support neural network trained to extract a biased feature included in features extracted by the first neural network that include a feature to be noticed in order to classify the target in the image data and the biased feature which is different from the feature to be noticed; and a second neural network configured to extract a biased feature of the target in the image data, wherein the one or more processors causes the learning apparatus to train the learning support neural network so that a difference between the biased feature extracted by the learning support neural network and the biased feature extracted by the second neural network is reduced, and train the first neural network so as to extract the feature from the image data that makes the difference increase in a result of the extraction by the learning support neural network.

Yet another aspect of the present disclosure provides a learning method executed in a learning apparatus comprising: a first neural network configured to extract a first feature of a target in image data; a second neural network configured to extract a second feature of the target in the image data using a different network structure from the first neural network; and a learning support neural network configured to extract a third feature from the first feature extracted by the first neural network, and wherein the second feature and the third feature are biased features for the target, the learning method comprising: training the learning support neural network so that the second feature extracted by the second neural network and the third feature extracted by the learning support neural network come closer, and training the first neural network so that the third feature appearing in the first feature extracted by the first neural network is reduced.

Still another aspect of the present disclosure provides a non-transitory computer readable storage medium storing a program for causing a computer to execute processing of: a first neural network configured to extract a first feature of a target in image data; a second neural network configured to extract a second feature of the target in the image data using a network structure different from the first neural network; and a learning support neural network configured to extract a third feature from the first feature extracted by the first neural network, wherein the second feature and the third feature are biased features for the target, and the program causes the computer to train the learning support neural network so that the second feature extracted by the second neural network and the third feature extracted by the learning support neural network come closer, and train the first neural network so that the third feature appearing in the first feature extracted by the first neural network is reduced.

According to the present invention, it is possible to adaptively extract a robust feature for a domain in target recognition.

BRIEF DESCRIPTION OF THE DRAWINGS

FIG. 4 is a diagram showing examples of training data according to the first embodiment;

DESCRIPTION OF THE EMBODIMENTS

Figure 1:
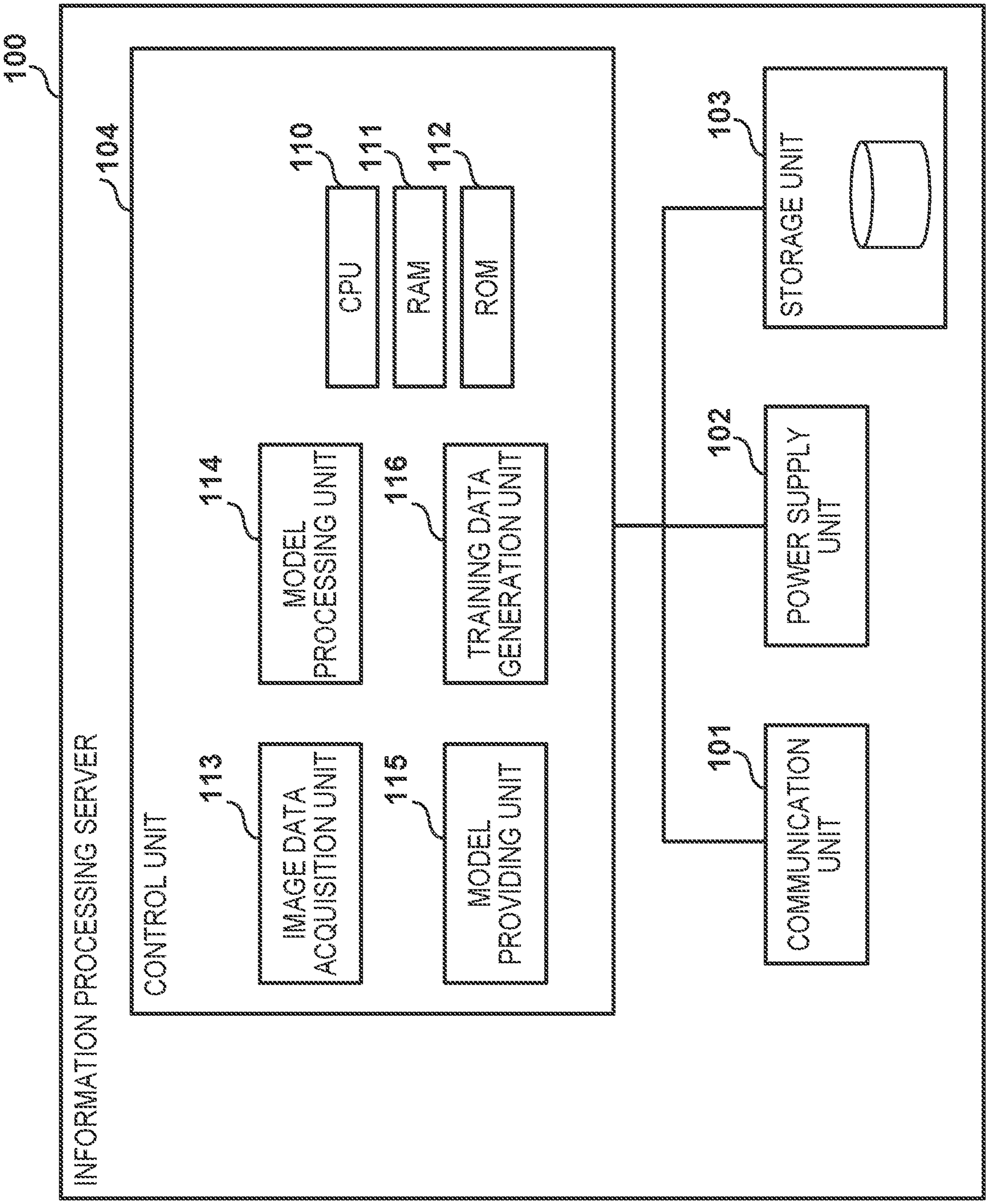
FIG. 1 is a block diagram showing a functional configuration example of an information processing server according to a first embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

<Configuration of Information Processing Server>

Next, a functional configuration example of an information processing server will be described with reference to FIG. 1. Note that some of functional blocks to be described with reference to the attached drawings may be integrated, and any of the functional blocks may be divided into separate blocks. In addition, a function to be described may be implemented by another block. Furthermore, a functional block to be described as hardware may be implemented by software, and vice versa.

A control unit 104 includes, for example, a central processing unit (CPU) 110, a random access memory (RAM) 111, and a read-only memory (ROM) 112, and controls operation of each unit of an information processing server 100. The control unit 104 causes each unit included in the control unit 104 to fulfill its function, by causing the CPU 110 to deploy, in the RAM 111, a computer program stored in the ROM 112 or a storage unit 103 and to execute the computer program. In addition to the CPU 110, the control unit 104 may further include a graphics processing unit (GPU) or dedicated hardware suitable for execution of machine learning processing or neural network processing.

An image data acquisition unit 113 acquires image data transmitted from an external device such as an information processing device or a vehicle operated by a user. The image data acquisition unit 113 stores the acquired image data in the storage unit 103. The image data acquired by the image data acquisition unit 113 may be used as training data to be described below, or may be input to a trained model of an inference stage so as to obtain an inference result from new image data.

A model processing unit 114 includes a learning model according to the present embodiment, and performs processing of a learning stage and processing of the inference stage of the learning model. For example, the learning model performs processing of recognizing a target included in image data by performing operation of a deep learning algorithm using a deep neural network (DNN) to be described below. The target may include a pedestrian, a vehicle, a two-wheeled vehicle, a signboard, a sign, a road, a white line or yellow line on the road, and the like included in an image.

The DNN is put into a trained state as a result of performing processing of the learning stage to be described below. Thus, the DNN can perform target recognition (processing of the inference stage) for new image data by inputting the new image data to the trained DNN. The processing of the inference stage is performed in a case where inference processing is performed in the information processing server 100 by use of a trained model. Note that the information processing server 100 may be configured such that the information processing server 100 executes a trained model that has been trained, and transmits an inference result to an external device such as a vehicle or an information processing device. Alternatively, the processing of the inference stage based on a learning model may be performed in a vehicle or an information processing device as necessary. In a case where the processing of the inference stage based on a learning model is performed in an external device such as a vehicle or an information processing device, a model providing unit 115 provides information on a trained model to the vehicle or the information processing device.

In a case where the inference processing is performed in the vehicle or the information processing device by use of a trained model, the model providing unit 115 transmits information on the trained model trained in the information processing server 100 to the vehicle or the information processing device. For example, when receiving the information on the trained model from the information processing server 100, the vehicle updates a trained model in the vehicle with the latest learning model, and performs target recognition processing (inference processing) by using the latest learning model. The information on the trained model includes version information on the learning model, information on weight coefficients of a trained neural network, and the like.

Note that the information processing server 100 can generally use more abundant computational resources than a vehicle or the like. In addition, it is possible to collect training data under a wide variety of circumstances by receiving and accumulating data on images captured by various vehicles, so that it is possible to perform learning in response to a wider variety of circumstances. Therefore, if a trained model trained by use of training data collected on the information processing server 100 can be provided to a vehicle or an external information processing device, a more robust inference result can be obtained for an image in the vehicle or the information processing device.

A training data generation unit 116 generates training data by using image data stored in the storage unit 103 on the basis of access from an external predetermined information processing device operated by an administrator user of the training data. For example, the training data generation unit 116 receives information on the type and position of a target included in the image data stored in the storage unit 103 (that is, a label indicating a correct answer for a target to be recognized), and stores the received label in the storage unit 103 in association with the image data. The label associated with the image data is held, in the storage unit 103, as training data in the form of, for example, a table. Details of the training data will be described below with reference to FIG. 4.

A communication unit 101 is, for example, a communication device including a communication circuit and the like, and communicates with an external device such as a vehicle or an information processing device through a network such as the Internet. The communication unit 101 receives an actual image transmitted from an external device such as a vehicle or an information processing device, and transmits information on a trained model to the vehicle at a predetermined timing or in a predetermined cycle. A power supply unit 102 supplies electric power to each unit in the information processing server 100. The storage unit 103 is a nonvolatile memory such as a hard disk or a semiconductor memory. The storage unit 103 stores training data to be described below, a program to be executed by the CPU 110, other data, and the like.

<Example of Learning Model in Model Processing Unit>

Figure 2:
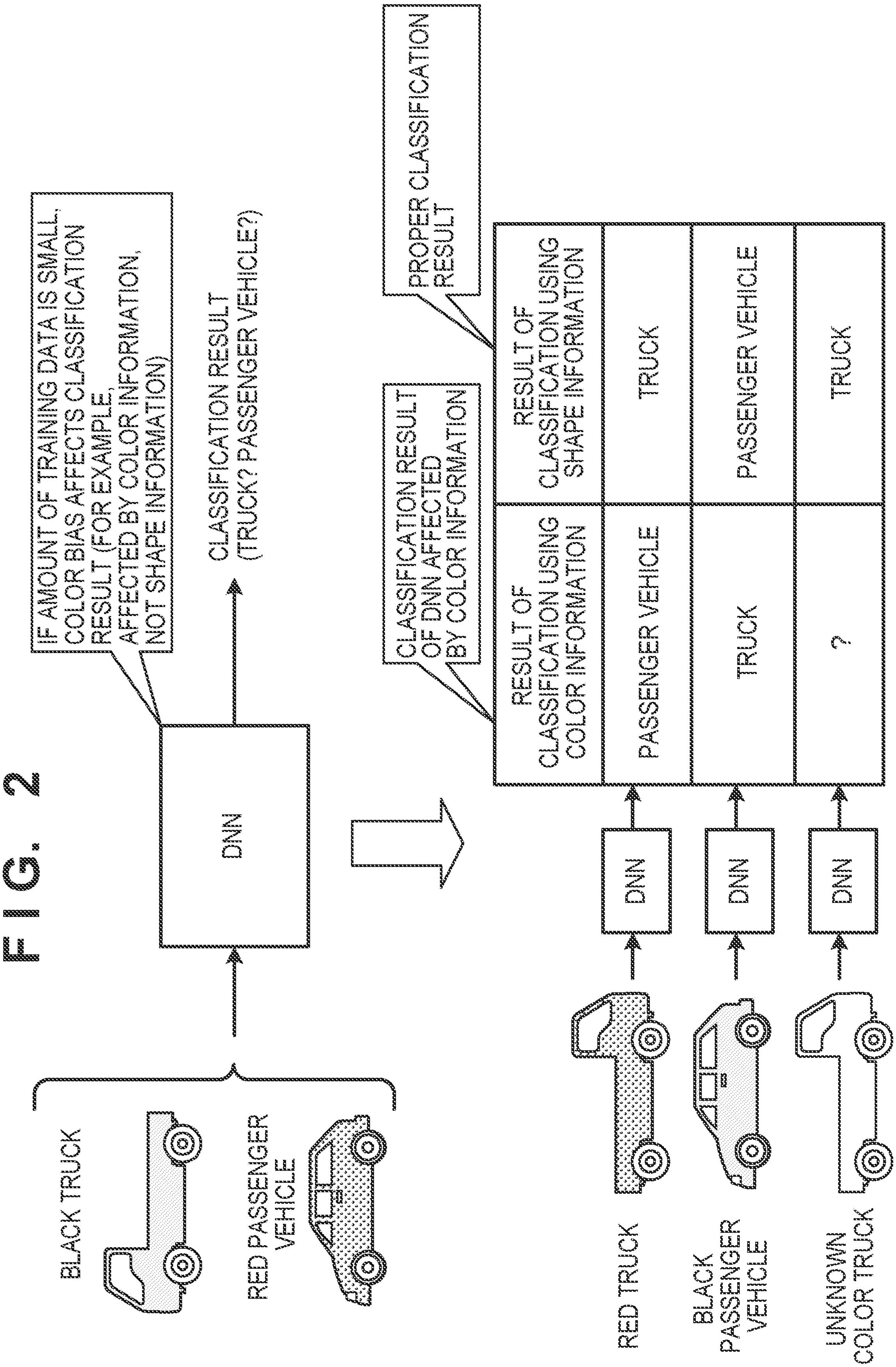
FIG. 2 is a diagram for describing a task of extracting features including a biased feature (a feature of a bias factor) in target recognition processing.

Next, a description will be given of an example of a learning model in the model processing unit 114 according to the present embodiment. First, a task of extracting features including a feature of a bias factor in target recognition processing will be described with reference to FIG. 2. FIG. 2 shows an example of a case where a color serves as a bias factor when shape is a feature to be noticed in target recognition processing. For example, a DNN shown in FIG. 2 is a DNN that infers whether a target in image data is a truck or a passenger vehicle, and has been trained by use of image data on a black truck and image data on a red passenger vehicle. That is, the DNN has been trained in consideration of not only features of shape to be noticed but also color features (biased features) different from the features to be noticed. In such a DNN, in a case where the image data on the black truck or the image data on the red passenger vehicle are input at the inference stage, a correct inference result (truck or passenger vehicle) can be output. Such an inference result may be a correct inference result output according to the feature to be noticed, or may be an inference result output according to the color feature different from the feature to be noticed.

In a case where the DNN outputs an inference result according to the color feature, if image data on a red truck are input to the DNN, the DNN outputs an inference result to the effect that the target is a passenger vehicle, and if image data on a black passenger vehicle are input to the DNN, the DNN outputs an inference result to the effect that the target is a truck. In addition, in a case where an image of a vehicle in an unknown color other than black or red is input, it is unclear what classification result can be obtained.

Meanwhile, in a case where the DNN outputs an inference result according to the feature of shape, if the image data on the red truck are input to the DNN, the DNN outputs an inference result to the effect that the target is a truck, and if the image data on the black passenger vehicle are input to the DNN, the DNN outputs an inference result to the effect that the target is a passenger vehicle. Furthermore, in a case where an image of a truck in an unknown color other than black or red is input, the DNN outputs an inference result to the effect that the target is a truck. As described above, in a case where the DNN is trained in such a way as to include a biased feature, a correct inference result cannot be output (that is, a robust feature cannot be extracted) when inference processing is performed on new image data.

Figure 3A:
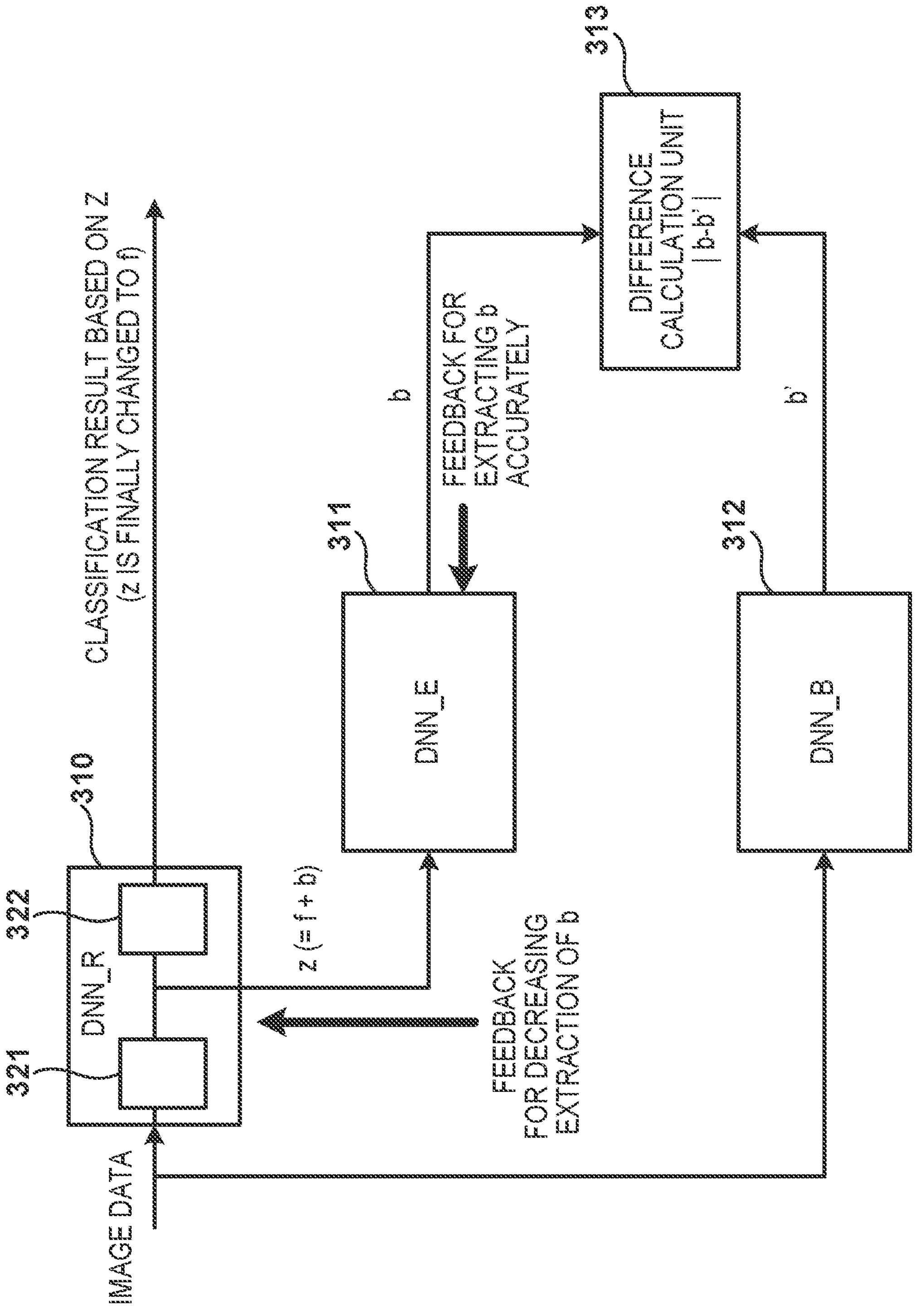
FIG. 3A is a diagram for describing a configuration example of deep neural networks (DNNs) of a model processing unit according to the first embodiment at a learning stage.

In order to reduce the influence of such a biased feature and enable the learning of a feature to be noticed, the model processing unit 114 includes DNNs shown in FIG. 3A in the present embodiment. Specifically, the model processing unit 114 includes a DNN_R 310, a DNN_E 311, a DNN_B 312, and a difference calculation unit 313.

The DNN_R 310 is a deep neural network (DNN) including one or more DNNs. The DNN_R 310 extracts a feature from image data, and outputs an inference result for a target included in the image data. In the example shown in FIG. 3A, the DNN_R 310 includes two DNNs, that is, a DNN 321 and a DNN 322. The DNN 321 is an encoder DNN that encodes a feature in image data, and outputs a feature (for example, z) extracted from the image data. The feature z includes a feature f to be noticed and a biased feature b. The DNN 322 is a classifier that classifies a target based on the feature z (the feature z is finally changed to the feature f as a result of learning) extracted from image data.

Figure 3B:
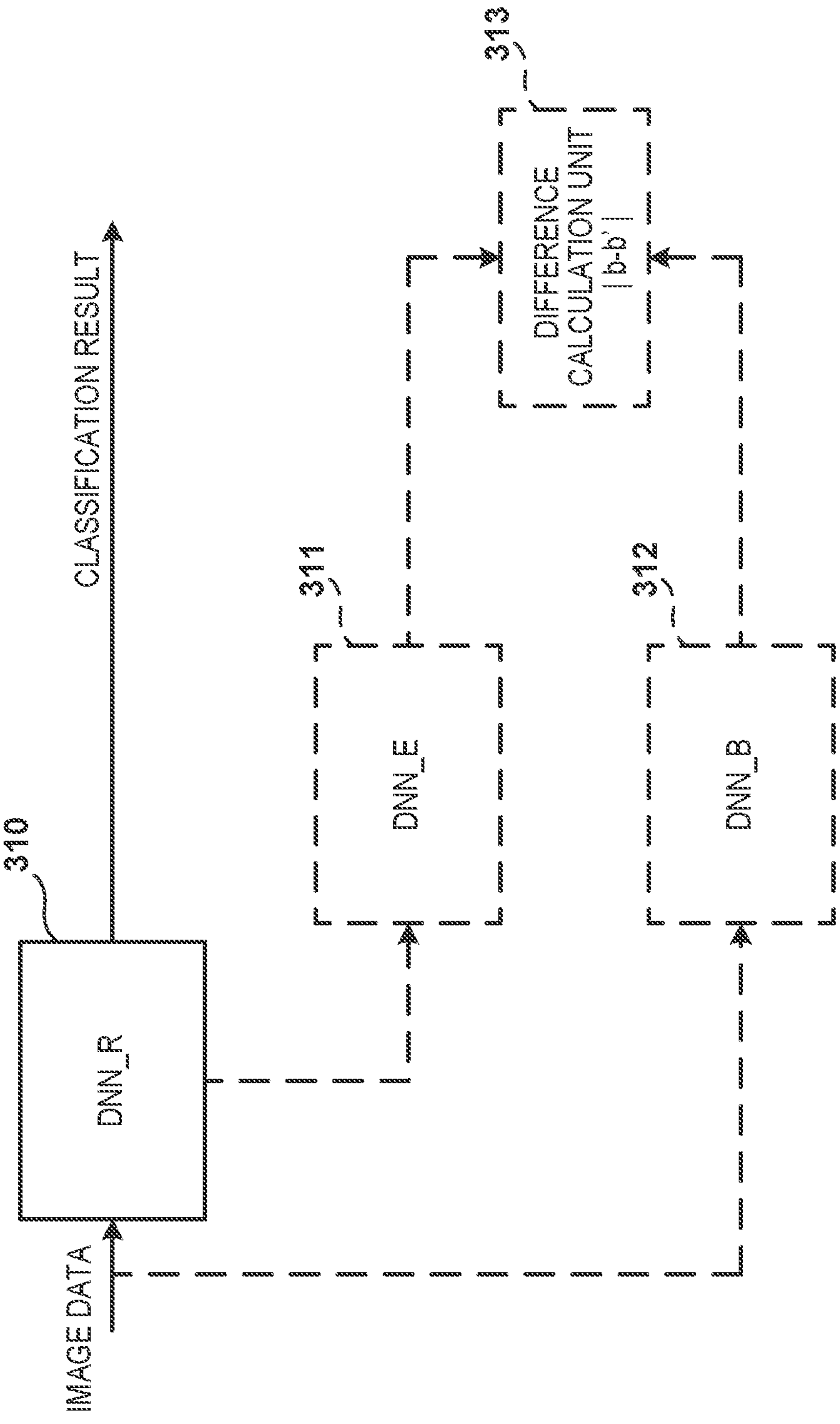
FIG. 3B is a diagram for describing a configuration example of the deep neural networks (DNNs) of the model processing unit according to the first embodiment at an inference stage.
Figure 3C:
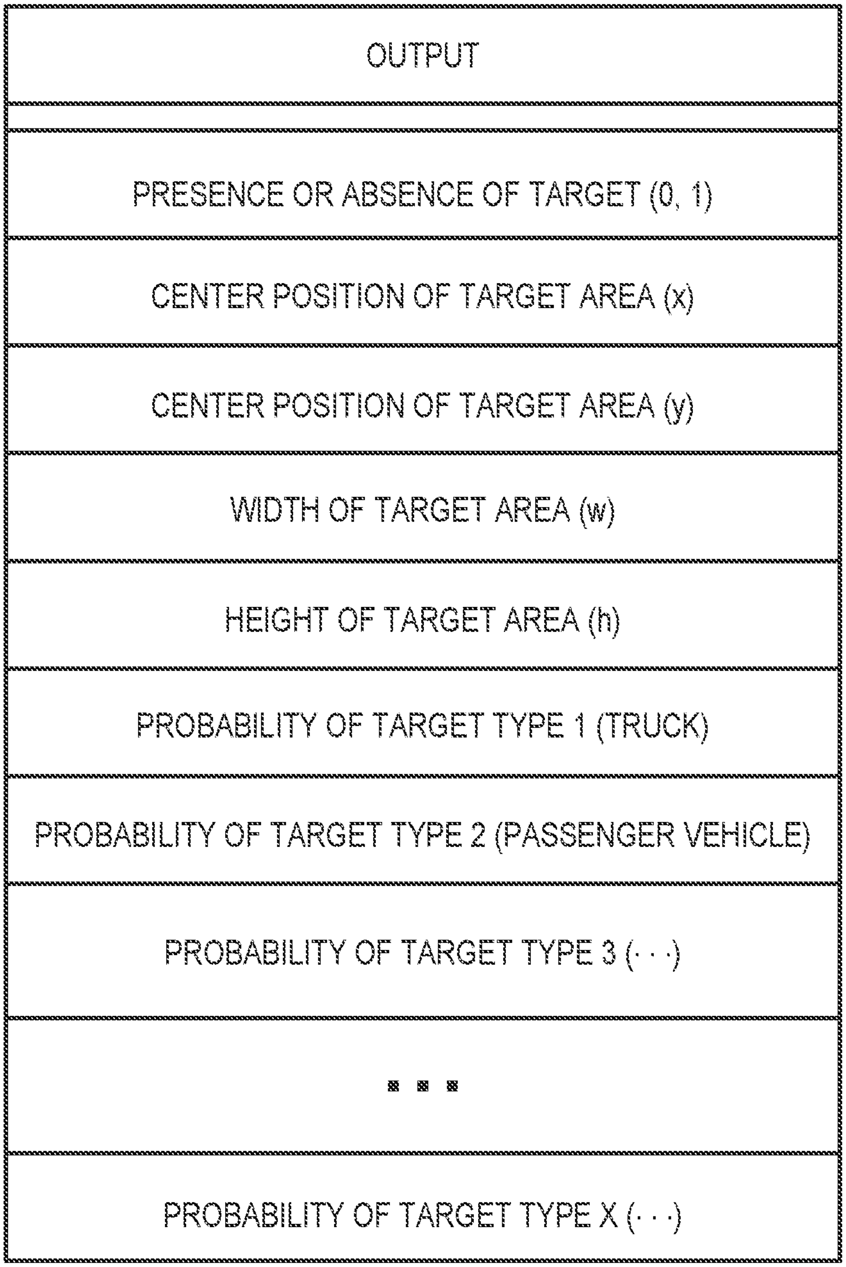
FIG. 3C is a diagram showing an example of output from the model processing unit according to the first embodiment.

The DNN_R 310 outputs, for example, data on an inference result as shown in FIG. 3C as an example. For example, the presence or absence of a target in an image (for example, 1 is set when a target exists, and 0 is set when no target exists) and the center position and size of a target area are output as data on the inference result as shown in FIG. 3C. In addition, the data include probability for each target type. For example, a probability that a recognized target is a truck, a passenger vehicle, an excavator, or the like is output in the range of 0 to 1.

Note that FIG. 3C shows a data example of a case where a single target is detected in image data. Meanwhile, inference result data may include data on a probability for each object type based on the presence or absence of the target in each predetermined area.

Furthermore, the DNN_R 310 may perform the processing of the learning stage by using, for example, data shown in FIG. 4 and image data as training data. The data shown in FIG. 4 include, for example, identifiers for identifying image data and corresponding labels. The label indicates a correct answer for a target included in image data indicated by an image ID. The label indicates, for example, the type (for example, a truck, a passenger vehicle, an excavator, or the like) of the target included in the corresponding image data. In addition, the training data may include data on the center position and size of the target. When the DNN_R 310 receives input of image data as training data and outputs the inference result data shown in FIG. 3C, the inference result data and the labels of the training data are compared, and learning is performed such that an error in the inference result is minimized. However, the training of the DNN_R 310 is constrained in such a way as to maximize a feature loss function to be described below.

The DNN_E 311 is a DNN that extracts the biased feature b from the feature z (z=feature f to be noticed+biased feature b) output from DNN_R 310. The DNN_E 311 functions as a learning support neural network that assists in training the DNN_R 310. The DNN_E 311 is trained in an adversarial relationship with the DNN_R 310 at the learning stage. As a result, the DNN_E 311 is trained such that the DNN_E 311 can extract the biased feature b with higher accuracy. Meanwhile, the DNN_R 310 is trained in an adversarial relationship with the DNN_E 311, so that the DNN_R 310 can remove the biased feature b and extract the feature f to be noticed with higher accuracy. That is, the feature z output from DNN_R 310 gets closer and closer to f.

The DNN_E 311 includes, for example, a known gradient reversal layer (GRL) that enables adversarial learning. The GRL is a layer in which the sign of a gradient for the DNN_E 311 is inverted when weight coefficients are changed for the DNN_E 311 and the DNN_R 310 on the basis of back propagation. As a result, in the adversarial learning, the gradient of the weight coefficients of the DNN_E 311 and the gradient of the weight coefficients of the DNN_R 310 are varied in association with each other, so that both the neural networks can be simultaneously trained.

The DNN_B 312 is a DNN that receives input of image data, and infers a classification result on the basis of a biased feature. The DNN_B 312 is trained to perform the same inference task (for example, target classification) as the DNN_R 310. That is, the DNN_B 312 is trained so as to minimize the same target loss function as a target loss function to be used by the DNN_R 310 (for example, a loss function that minimizes the difference between a target inference result and training data).

However, the DNN_B 312 is trained to extract a biased feature and output an optimal classification result on the basis of the extracted feature. In the present embodiment, image data are input to the DNN_B 312 that has been trained, and a biased feature b' extracted in the DNN_B 312 is pulled out.

The training of the DNN_B 312 is completed before the DNN_R 310 and the DNN_E 311 are trained. Therefore, the DNN_B 312 functions in such a way as to extract a correct bias factor (biased feature b') included in the image data and provide the extracted bias factor to the DNN_E 311 in the course of training the DNN_R 310 and the DNN_E 311. The DNN_B 312 has a network structure different from that of the DNN_R 310, and is configured to extract a feature different from a feature to be extracted by the DNN_R 310. For example, the DNN_B 312 includes a neural network having a network structure smaller in scale (smaller in the number of parameters and complexity) than network structures of the neural networks included in the DNN_R 310, and is configured to extract a superficial feature (bias factor) of image data. The DNN_E 311 may be configured to handle image data lower in resolution than image data to be handled by the DNN_R 310, or may be configured such that the DNN_E 311 is smaller in the number of layers than the DNN_R 310. For example, the DNN_E 311 extracts, as a biased feature, a main color in an image. Alternatively, the DNN_B 312 may be configured to extract a local feature in image data, with a kernel size smaller than that of the DNN_R 310 so as to extract, as a biased feature, a texture feature in the image.

Note that, although not explicitly shown in FIG. 3A, the DNN_B 312 may include two DNNs as in the example of the DNN_R 310. For example, the DNN_B 312 may include an encoder DNN that extracts the biased feature b' and a classifier DNN that infers a classification result on the basis of the biased feature b'. At this time, the encoder DNN of the DNN_B 312 is configured to extract a different feature (feature different from that to be extracted by the encoder DNN of the DNN_R 310) from image data, with a network structure different from the encoder DNN of the DNN_R 310.

The difference calculation unit 313 compares the biased feature b' output from the DNN_B 312 with the biased feature b output from the DNN_E 311 to calculate a difference therebetween. The difference calculated by the difference calculation unit 313 is used to calculate a feature loss function.

In the present embodiment, the DNN_E 311 is trained so as to minimize the feature loss function based on the difference calculated by the difference calculation unit 313. Therefore, the DNN_E 311 proceeds with learning such that the biased feature b extracted by the DNN_E 311 comes closer to the biased feature b' extracted by the DNN_B 312. That is, the DNN_E 311 proceeds with learning so as to extract the biased feature b with higher accuracy from the feature z extracted by the DNN_R 310.

Meanwhile, the DNN_R 310 proceeds with learning in such a way as to maximize the feature loss function based on the difference calculated by the difference calculation unit 313 and minimize the target loss function of the inference task (for example, target classification). In other words, in the present embodiment, learning is subject to explicit constraints such that the feature z extracted by the DNN_R 310 minimizes the bias factor b while maximizing the feature f to be noticed. In particular, in the learning method according to the present embodiment, the DNN_R 310 and the DNN_E 311 are trained in an adversarial relationship with each other. Thus, parameters of the DNN_R 310 are trained to extract the feature z that prevents the DNN_E 311 (deceives the DNN_E 311), which extracts the biased feature b, from extracting the biased feature b with ease.

In the present embodiment, a case where the DNN_R 310 and the DNN_E 311 are simultaneously updated by use of the GRL included in the DNN_E 311 has been described as an example of such adversarial learning. However, the DNN_R 310 and the DNN_E 311 may be alternately updated. For example, first, the DNN_R 310 is fixed, and then the DNN_E 311 is updated in such a way as to minimize the feature loss function based on the difference calculated by the difference calculation unit 313. Next, the DNN_E 311 is fixed, and the DNN_R 310 is updated in such a way as to maximize the feature loss function based on the difference calculated by the difference calculation unit 313 and minimize the target loss function of the inference task (for example, target classification). Such learning enables the DNN_R 310 to accurately extract the feature f to be noticed, so that a robust feature can be extracted.

When the processing performed by DNN_R 310 at the learning stage is completed on the basis of the above-described adversarial learning, the DNN_R 310 becomes a trained model that is available at the inference stage. At the inference stage, as shown in FIG. 3B, image data are input only to the DNN_R 310, and the DNN_R 310 outputs only an inference result (classification result of target). That is, the DNN_E 311, the DNN_B 312, and the difference calculation unit 313 do not operate at the inference stage.

<Series of Operation Steps of Processing to Be Performed in Model Processing Unit at Learning Stage>

Next, a series of operation steps to be performed in the model processing unit 114 at the learning stage will be described with reference to FIGS. 5A and 5B. Note that the present processing is implemented by the CPU 110 of the control unit 104 deploying, in the RAM 111, a program stored in the ROM 112 or the storage unit 103 and executing the program. Note that each DNN of the model processing unit 114 of the control unit 104 is yet to be trained, and is put into a trained state as a result of the present processing.

In S501, the control unit 104 causes the DNN_B 312 of the model processing unit 114 to perform learning. The DNN_B 312 may perform learning by using the same training data as training data for training the DNN_R 310. Image data are input as training data to the DNN_B 312 to cause the DNN_B 312 to calculate a classification result. As described above, the DNN_B 312 is trained to minimize a loss function obtained based on the difference between a classification result and the label of training data. As a result, the DNN_B 312 is trained to extract a biased feature. Although the present flowchart is simplified, repetitive processing is performed also in the training of the DNN_B 312 according to the number of pieces of training data and the number of epochs.

In S502, the control unit 104 reads image data associated with training data from the storage unit 103. Here, the training data include the data described above with reference to FIG. 4.

In S503, the model processing unit 114 applies weight coefficients of the current neural network to the read image data, and outputs the extracted feature z and an inference result.

In S504, the model processing unit 114 inputs, to the DNN_E 311, the feature z extracted in the DNN_R 310, and extracts the biased feature b'. Furthermore, in S505, the model processing unit 114 inputs the image data to the DNN_B 312, and extracts a biased feature b' from the image data.

In S506, the model processing unit 114 calculates a difference (difference absolute value) between the biased feature b and the biased feature b' by means of the difference calculation unit 313. In S507, the model processing unit 114 calculates the loss of the target loss function ($L_f$) described above on the basis of the difference between the inference result of the DNN_R 310 and the label of the training data. In S508, the model processing unit 114 calculates the loss of the feature loss function ($L_b$) described above on the basis of the difference between the biased feature b and the biased feature b'.

In S509, the model processing unit 114 determines whether the processing in S502 to S508 above has been performed for all predetermined training data. In a case where the model processing unit 114 determines that the processing has been performed for all the predetermined training data, the process proceeds to S510. Otherwise, the process returns to S502 to perform the processing in S502 to S508 by using further training data.

In S510, the model processing unit 114 changes the weight coefficients of the DNN_E 311 such that the sum of the respective losses of the feature loss function ($L_b$) for pieces of training data decreases (that is, the biased feature b is more accurately extracted from the feature z extracted by the DNN_R 310). Meanwhile, in S511, the model processing unit 114 changes the weight coefficients of the DNN_R 310 such that the sum of the losses of the feature loss function ($L_b$) increases and the sum of the losses of the target loss function ($L_f$) decreases. That is, the model processing unit 114 causes the DNN_B 312 to perform learning such that the feature z extracted by the DNN_R 310 minimizes the bias factor b while maximizing the feature f to be noticed.

In S512, the model processing unit 114 determines whether processing has been completed for the predetermined number of epochs. That is, it is determined whether the processing in S502 to S511 has been repeated a predetermined number of times. As a result of repeating the processing in S502 to S511, the weight coefficients of the DNN_R 310 and the DNN_E 311 are changed in such a way as to gradually converge to optimum values. In a case where the model processing unit 114 determines that the processing has not been completed for the predetermined number of epochs, the process returns to S502, and otherwise, the present series of processing steps ends. In this way, when a series of operation steps at the learning stage is completed in the model processing unit 114, each DNN (particularly, the DNN_R 310) in the model processing unit 114 is put into a trained state.

<Series of Operation Steps to Be Performed in Model Processing Unit at Inference Stage>

Figure 6:
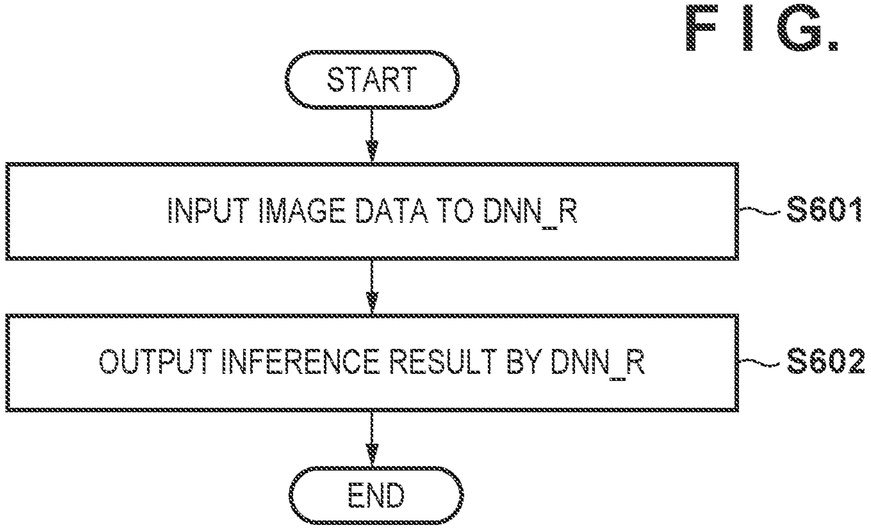
FIG. 6 is a flowchart showing a series of operation steps for inference stage processing to be performed in the model processing unit according to the first embodiment.

Next, a series of operation steps to be performed in the model processing unit 114 at the inference stage will be described with reference to FIG. 6. The present processing is processing of outputting a classification result of target for data on an image actually captured by a vehicle or an information processing device (that is, unknown image data without a correct answer). Note that the present processing is implemented by the CPU 110 of the control unit 104 deploying, in the RAM 111, a program stored in the ROM 112 or the storage unit 103 and executing the program. Furthermore, in the present processing, the DNN_R 310 of the model processing unit 114 has been trained in advance.

That is, weight coefficients have been determined such that the feature f to be noticed will be detected by the DNN_R 310 at the maximum.

In S601, the control unit 104 inputs, to the DNN_R 310, image data acquired from a vehicle or an information processing device. In S602, the model processing unit 114 performs target recognition processing by means of the DNN_R 310, and outputs an inference result. When the inference processing ends, the control unit 104 ends a series of operation steps related to the present processing.

As described above, in the present embodiment, the information processing server includes the DNN_R, the DNN_B, and the DNN_E. The DNN_R extracts a feature of a target in image data. The DNN_B extracts a feature of the target in the image data by using a network structure different from that of the DNN_R. The DNN_E extracts a biased feature from the feature extracted by the DNN_R. Then, the DNN_E 311 is trained such that a biased feature extracted by the DNN_B 312 comes closer to a biased feature extracted by the DNN_E 311. In addition, the DNN_R 310 is trained such that a biased feature appearing in the feature extracted by the DNN_R 310 is reduced. In this way, it is possible to adaptively extract a robust feature for a domain in target recognition.

Second Embodiment

Next, a second embodiment of the present invention will be described. In the above-described embodiment, the case where the processing of the learning stage and the processing of the inference stage of the neural networks are performed in the information processing server 100 has been described as an example. However, the present embodiment is applicable not only to a case where the processing of the learning stage is performed in an information processing server but also to a case where the processing is performed in a vehicle. That is, training data provided by the information processing server 100 may be input to a model processing unit of a vehicle to train a neural network in the vehicle. Then, the processing of the inference stage may be performed by use of the trained neural network. Hereinafter, a functional configuration example of a vehicle in such an embodiment will be described.

Furthermore, while a case where a control unit 708 is incorporated in a vehicle 700 will be described as an example below, an information processing device having the configuration of the control unit 708 may be mounted on the vehicle 700. That is, the vehicle 700 may be a vehicle equipped with an information processing device including constituent elements such as a central processing unit (CPU) 710 and a model processing unit 714 included in the control unit 708.

<Configuration of Vehicle>

Figure 7:
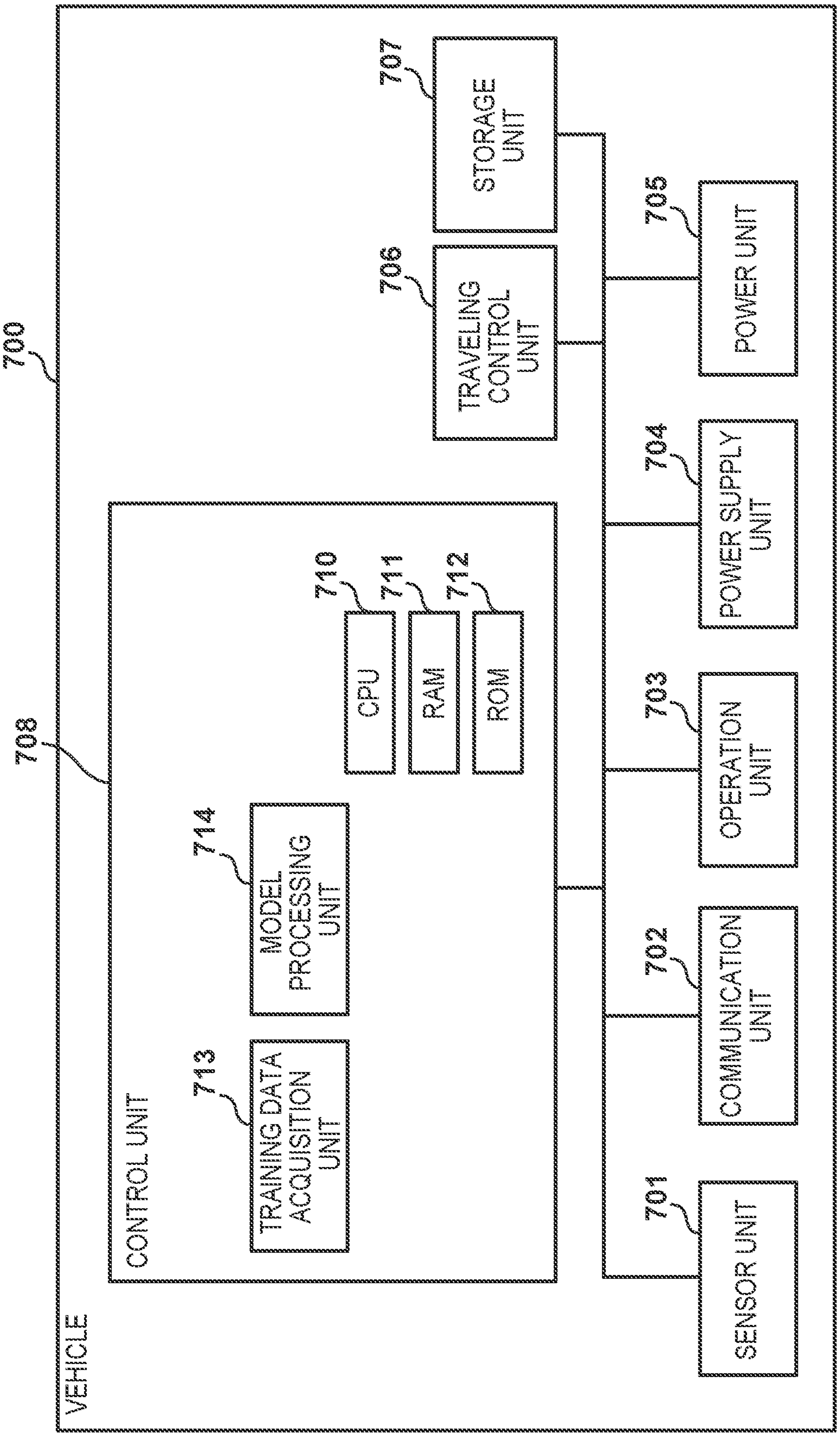
FIG. 7 is a block diagram showing a functional configuration example of a vehicle according to a second embodiment.

A functional configuration example of the vehicle 700 according to the present embodiment will be described with reference to FIG. 7. Note that some of functional blocks to be described with reference to the attached drawings may be integrated, and any of the functional blocks may be divided into separate blocks. In addition, a function to be described may be implemented by another block. Furthermore, a functional block to be described as hardware may be implemented by software, and vice versa.

A sensor unit 701 includes a camera (providing imaging function) that outputs a captured image of a forward view (or captured images of a forward view, a rear view, and a view of surroundings) from the vehicle. The sensor unit 701 may further include a light detection and ranging (Lidar) that outputs a range image obtained by measurement of a distance to an object in front of the vehicle (or distances to objects in front of, in the rear of, and around the vehicle). The captured image is used, for example, for inference processing of target recognition in the model processing unit 714. In addition, the sensor unit 701 may include various sensors that output acceleration, position information, a steering angle, and the like of the vehicle 700.

A communication unit 702 is a communication device including, for example, a communication circuit, and communicates with an information processing server 100, a transportation system located around the vehicle 700, and the like through, for example, Long Term Evolution (LTE), LTE-Advanced, or mobile communication standardized as the so-called fifth generation mobile communication system (5G). The communication unit 702 acquires training data from the information processing server 100. In addition, the communication unit 702 receives a part or all of map data, traffic information, and the like from another information processing server or the transportation system located around the vehicle 700.

An operation unit 703 includes operation members and members that receive input for driving the vehicle 700. Examples of the operation members include a button and a touch panel installed in the vehicle 700. Examples of the members that receive such input include a steering wheel and a brake pedal. A power supply unit 704 includes a battery including, for example, a lithium-ion battery, and supplies electric power to each unit in the vehicle 700. A power unit 705 includes, for example, an engine or a motor that generates power for causing the vehicle to travel.

Based on a result of the inference processing (for example, a result of target recognition) output from the model processing unit 714, a traveling control unit 706 controls the traveling of the vehicle 700 in such a way as to, for example, keep the vehicle 700 traveling in the same lane or cause the vehicle 700 to follow a vehicle ahead while traveling. Note that in the present embodiment, such traveling control can be performed by use of a known method. Note that, as an example, the traveling control unit 706 is described as a constituent element separate from the control unit 708 in the description of the present embodiment, but may be included in the control unit 708.

A storage unit 707 includes a nonvolatile large-capacity storage device such as a semiconductor memory. The storage unit 707 temporarily stores various sensor data, such as an actual image, output from the sensor unit 701. In addition, a training data acquisition unit 713 to be described below stores training data that are received from, for example, the information processing server 100 external to the vehicle 700 via the communication unit 702 and used by the model processing unit 714 for learning.

The control unit 708 includes, for example, the CPU 710, a random access memory (RAM) 711, and a read-only memory (ROM) 712, and controls operation of each unit of the vehicle 700. Furthermore, the control unit 708 acquires image data from the sensor unit 701, performs the above-described inference processing including target recognition processing and the like, and also performs processing of a learning stage of the model processing unit 714 by using image data received from the information processing server 100. The control unit 708 causes units, such as the model processing unit 714, included in the control unit 708 to fulfill their respective functions, by causing the CPU 710 to deploy, in the RAM 711, a computer program stored in the ROM 712 and to execute the computer program.

The CPU 710 includes one or more processors. The RAM 711 includes a volatile storage medium such as a dynamic RAM (DRAM), and functions as a working memory of the CPU 710. The ROM 712 includes a nonvolatile storage medium, and stores, for example, a computer program to be executed by the CPU 710 and a setting value to be used when the control unit 708 is operated. Note that a case where the CPU 710 implements the processing of the model processing unit 714 will be described as an example in the following embodiment, but the processing of the model processing unit 714 may be implemented by one or more other processors (for example, graphics processing units (GPUs)) (not shown).

The training data acquisition unit 713 acquires, as training data, image data and the data shown in FIG. 4 from the information processing server 100, and stores the data in the storage unit 707. The training data are used for training the model processing unit 714 at the learning stage.

The model processing unit 714 includes deep neural networks with the same configuration as the configuration shown in FIG. 3A of the first embodiment. The model processing unit 714 performs processing of the learning stage and processing of an inference stage by using the training data acquired by the training data acquisition unit 713. The processing of the learning stage and the processing of the inference stage to be performed by the model processing unit 714 can be performed as with the processing described in the first embodiment.

<Main Configuration for Traveling Control of Vehicle>

Figure 8:
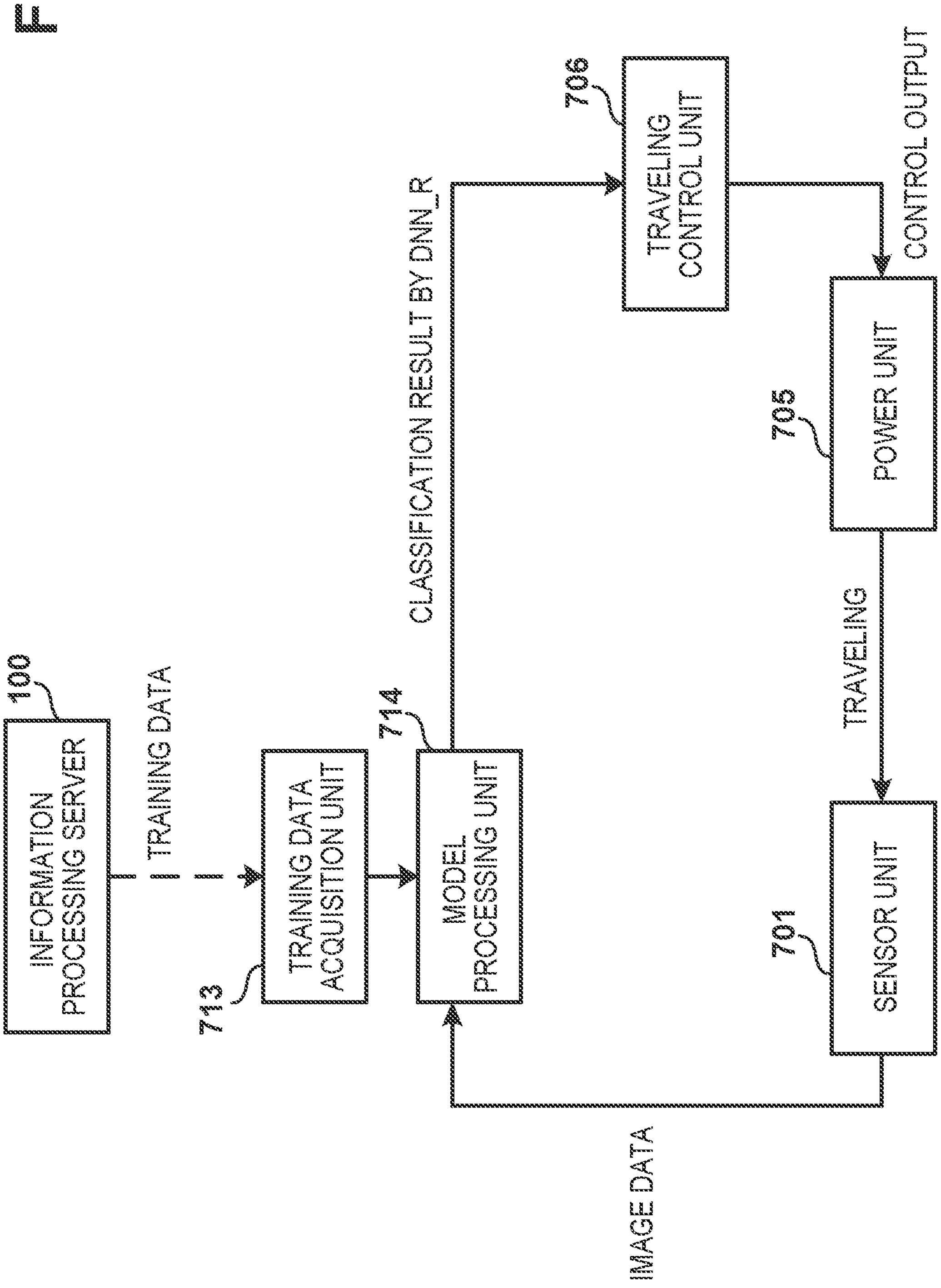
FIG. 8 is a diagram showing a main configuration for traveling control of the vehicle according to the second embodiment.

Next, a main configuration for the traveling control of the vehicle 700 will be described with reference to FIG. 8. The sensor unit 701 captures, for example, images of a forward view from the vehicle 700, and outputs image data on the captured images a predetermined number of times per second. The image data output from the sensor unit 701 are input to the model processing unit 714 of the control unit 708. The image data input to the model processing unit 714 are used for target recognition processing (processing of the inference stage) for controlling the traveling of the vehicle at the present moment.

The model processing unit 714 receives input of the image data output from the sensor unit 701, performs target recognition processing, and outputs a classification result to the traveling control unit 706. The classification result may be similar to the output data shown in FIG. 3C of the first embodiment.

The traveling control unit 706 performs vehicle control for the vehicle 700 by outputting a control signal to, for example, the power unit 705 on the basis of the result of target recognition and various sensor information, such as the acceleration and steering angle of the vehicle, obtained from the sensor unit 701. As described above, since the vehicle control to be performed by the traveling control unit 706 can be performed by use of a known method, details are omitted in the present embodiment. The power unit 705 controls generation of power according to the control signal from the traveling control unit 706.

The training data acquisition unit 713 acquires the training data transmitted from the information processing server 100, that is, the image data and the data shown in FIG. 4. The acquired data are used for training the DNNs of the model processing unit 714.

Figure 5A:
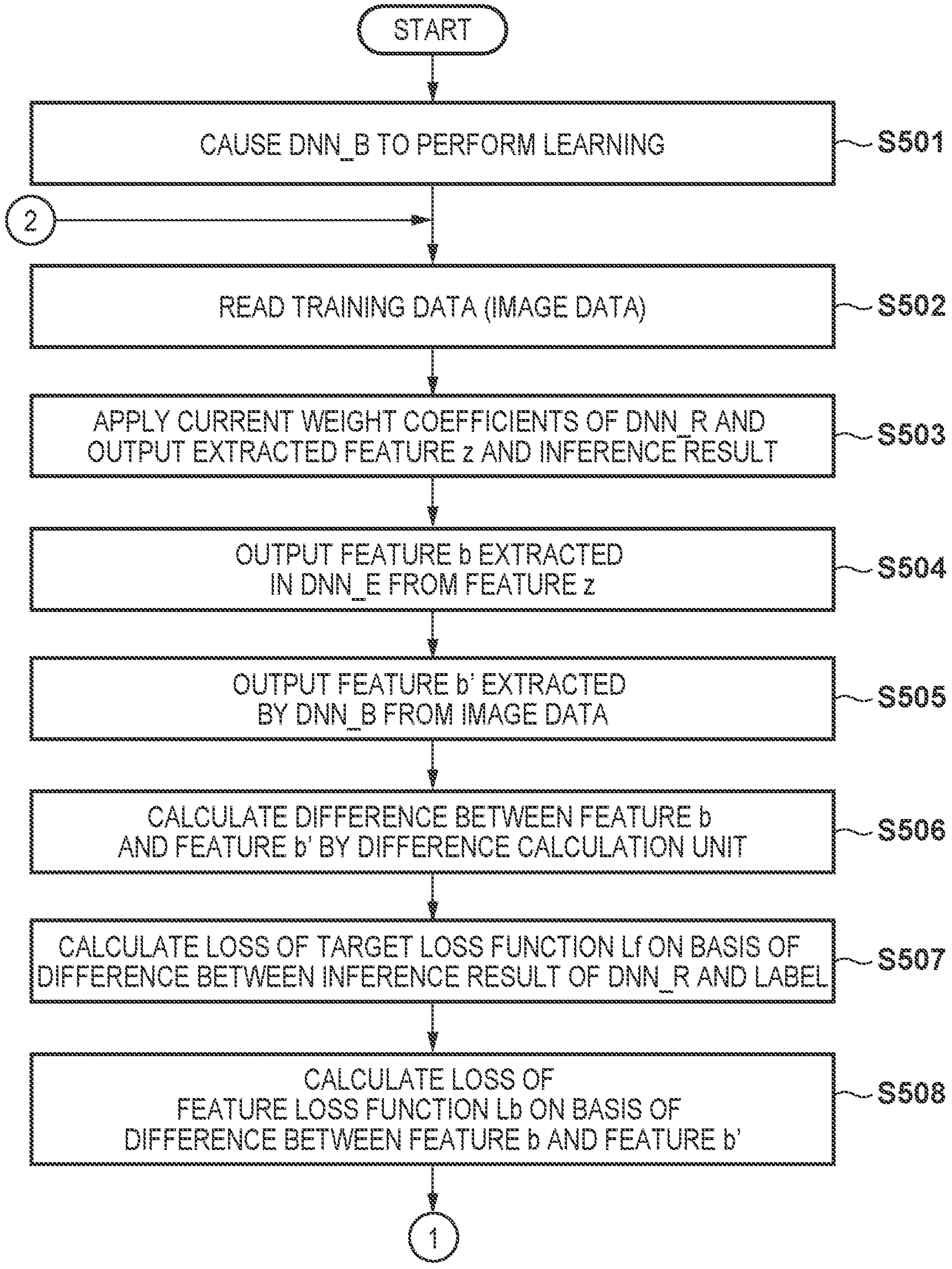
FIG. 5A and FIG. 5B are flowcharts showing a series of operation steps for learning stage processing to be performed in the model processing unit according to the first embodiment.
Figure 5B:
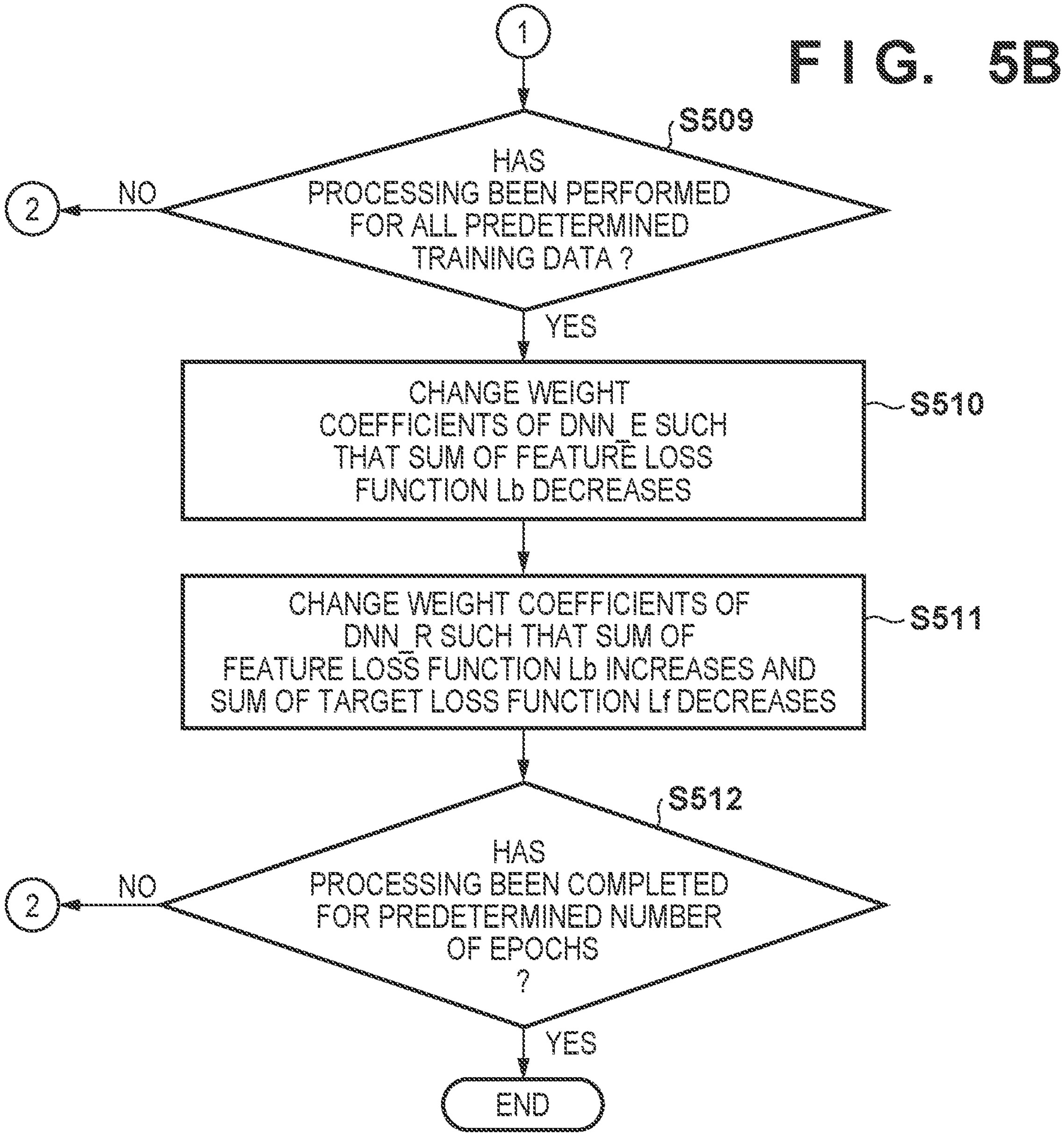

The vehicle 700 may perform a series of processing steps of the learning stage as with the processing steps shown in FIGS. 5A and 5B by using the training data stored in the storage unit 707. In addition, the vehicle 700 may perform a series of processing steps of the inference stage as with the processing steps shown in FIG. 6.

As described above, in the present embodiment, the deep neural networks for target recognition are trained in the model processing unit 714 in the vehicle 700. That is, the vehicle includes a DNN_R, a DNN_B, and a DNN_E. The DNN_R extracts a feature of a target in image data. The DNN_B extracts a feature of the target in the image data by using a network structure different from that of the DNN_R. The DNN_E extracts a biased feature from the feature extracted by the DNN_R. Then, the DNN_E 311 is trained such that a biased feature extracted by the DNN_B 312 comes closer to a biased feature extracted by the DNN_E 311. In addition, the DNN_R 310 is trained such that a biased feature appearing in the feature extracted by the DNN_R 310 is reduced. In this way, it is possible to adaptively extract a robust feature for a domain in target recognition.

Note that, in the above embodiments, examples have been described in which the DNN processing shown in FIG. 3A is performed in the information processing server as an example of the learning apparatus and in the vehicle as another example of the learning apparatus. However, the learning apparatus is not limited to the information processing server and the vehicle, and the DNN processing shown in FIG. 3A may be performed by another apparatus.

The invention is not limited to the foregoing embodiments, and various variations/changes are possible within the spirit of the invention.

What is claimed is:

1. A learning apparatus comprising:

one or more processors; and a memory storing instructions which, when the instructions are executed by the one or more processors, cause the learning apparatus to execute processing of:

a first neural network that extracts a first feature of a target in image data, wherein the first feature of the target includes a predetermined biased feature and a feature to be noticed for classifying the target in the image data;

a learning support neural network that extracts the predetermined biased feature from the first feature extracted by the first neural network; and a second neural network that extracts the predetermined biased feature of the target in the image data and that is a trained neural network with a network structure different from the first neural network, wherein the second neural network is trained before the first neural network and the learning support neural network are trained, and provides the predetermined biased feature extracted from the image data while the learning support neural network and the first neural network are being trained;

wherein the one or more processors cause the learning apparatus to train the learning support neural network so that a difference between the predetermined biased feature extracted from the first feature by the learning support neural network and the predetermined biased feature extracted from the image data by the second neural network is reduced, and train the first neural network so that the predetermined biased feature appearing in the first feature extracted by the first neural network is reduced based on the difference, wherein the predetermined biased feature is different from the feature to be noticed for classifying the target in the image data, wherein the one or more processors cause the learning apparatus to train the first neural network to maximize a feature loss based on the difference while minimizing a target loss function, and wherein the trained first neural network is deployed in a vehicle and executes inference processing for an image captured in the vehicle.

2. The learning apparatus according to claim 1, wherein the scale of the network structure of the second neural network is smaller than scale of the network structure of the first neural network.

3. The learning apparatus according to claim 1, wherein the first neural network and the second neural network comprise a respective kernel for extracting a local feature in an image, and the size of the kernel of the second neural network is smaller than the size of the kernel of the first neural network.

4. The learning apparatus according to claim 1, wherein the first neural network is a neural network that classifies the target by extracting the first feature of the target in the image data, the second neural network is a neural network that classifies the target by extracting the predetermined biased feature of the target in the image data.

5. The learning apparatus according to claim 4, wherein the one or more processors causes the learning apparatus to train the first neural network so that a difference between a classification result output from the first neural network and training data for the target is reduced while training the first neural network so that the predetermined biased feature appearing in the first feature extracted by the first neural network is reduced.

6. The learning apparatus according to claim 1, wherein the one or more processors causes the learning apparatus to utilize GRL (Gradient reversal layer) to vary weight coefficients of the first neural network and the weight coefficients of the learning support neural network in association with each other.

7. The learning apparatus according to claim 1, wherein the second neural network is a trained neural network for extracting the predetermined biased feature of the target in the image data.

8. The learning apparatus according to claim 1, wherein the learning apparatus is an information processing server.

9. The learning apparatus according to claim 1, wherein the learning apparatus is a vehicle.

10. A learning apparatus comprising:

one or more processors; and a memory storing instructions which, when the instructions are executed by the one or more processors, cause the learning apparatus to execute processing of:

a first neural network, a second neural network, and a learning support neural network, wherein the first neural network extracts a first feature of image data from the image data, and the first feature of the target includes a predetermined biased feature and a feature to be noticed for classifying the target in the image data, the second neural network, that is a trained neural network with a smaller scale of network structure than the first neural network, extracts a feature including a bias factor of the image data from the image data, and the second neural network is trained before the first neural network and the learning support neural network are trained, and provides the bias factor extracted from the image data while the learning support neural network and the first neural network are being trained, the learning support neural network that extracts a feature including the bias factor of the image data from the first feature of the image data extracted by the first neural network, and wherein the one or more processors further cause the learning apparatus to compare the feature including the bias factor extracted from the image data by the second neural network with the feature including the bias factor extracted, by the learning support neural network, from the first feature extracted by the first neural network, and to output a loss, wherein the bias factor is different from the feature to be noticed for classifying the target in the image data, wherein the one or more processors cause the learning apparatus to train the first neural network to maximize a feature loss based on the difference while minimizing a target loss function, and wherein the trained first neural network is deployed in a vehicle and executes inference processing for an image captured in the vehicle.

11. A learning apparatus comprising:

one or more processors; and a memory storing instructions which, when the instructions are executed by the one or more processors, cause the learning apparatus to execute processing of:

a first neural network to extract features of a target in image data and classify the target;

a learning support neural network to extract a biased feature included in features extracted by the first neural network, wherein the features extracted by the first neural network include a feature to be noticed in order to classify the target in the image data and the biased feature which is different from the feature to be noticed, and the second neural network is trained before the first neural network and the learning support neural network are trained, and provides the biased feature extracted from the image data while the learning support neural network and the first neural network are being trained; and a second neural network that is a trained neural network to extract the biased feature of the target in the image data from the image data, wherein the one or more processors causes the learning apparatus to train the learning support neural network so that a difference between the biased feature extracted from the features extracted by the first neural network by the learning support neural network and the biased feature extracted from the image data by the second neural network is reduced, and train the first neural network so as to extract the features from the image data that makes the difference increase in a result of the extraction by the learning support neural network, wherein the predetermined biased feature is different from the feature to be noticed for classifying the target in the image data, wherein the one or more processors cause the learning apparatus to train the first neural network to maximize a feature loss based on the difference while minimizing a target loss function, and wherein the trained first neural network is deployed in a vehicle and executes inference processing for an image captured in the vehicle.

12. A learning method executed in a learning apparatus comprising:

a first neural network that extracts a first feature of a target in image data, wherein the first feature of the target includes a predetermined biased feature and a feature to be noticed for classifying the target in the image data;

a second neural network that extracts a predetermined biased feature of the target in the image data and that is trained neural network with a different network structure from the first neural network; and a learning support neural network that extracts the predetermined biased feature from the first feature extracted by the first neural network, wherein the second neural network is trained before the first neural network and the learning support neural network are trained, and provides the predetermined biased feature extracted from the image data while the learning support neural network and the first neural network are being trained, the learning method comprising:

training the learning support neural network so that a difference between the predetermined biased feature extracted from the first feature extracted by the learning support neural network and the predetermined biased feature extracted from the image data by the second neural network is reduced, and training the first neural network to maximize a feature loss based on the difference while minimizing a target loss function so that the predetermined biased feature appearing in the first feature extracted by the first neural network is reduced based on the difference, wherein the predetermined biased feature is different from the feature to be noticed for classifying the target in the image data, and wherein the trained first neural network is deployed in a vehicle and executes inference processing for an image captured in the vehicle.

13. A non-transitory computer readable storage medium storing a program for causing a computer to execute processing of:

a first neural network that extracts a first feature of a target in image data, wherein the first feature of the target includes a predetermined biased feature and a feature to be noticed for classifying the target in the image data;

a learning support neural network extracts the predetermined biased feature from the first feature extracted by the first neural network; and a second neural network that extracts a predetermined biased feature of the target in the image data and that is trained neural network with a network structure different from the first neural network, wherein the second neural network is trained before the first neural network and the learning support neural network are trained, and provides the predetermined biased feature extracted from the image data while the learning support neural network and the first neural network are being trained;

wherein the program causes the computer to train the learning support neural network so that a difference between the predetermined biased feature extracted from the first feature by the learning support neural network and the predetermined biased feature extracted from the image data by the second neural network is reduced, and train the first neural network so that the predetermined biased feature appearing in the first feature extracted by the first neural network is reduced based on the difference, wherein the predetermined biased feature is different from the feature to be noticed for classifying the target in the image data, wherein the program causes the computer to train the first neural network to maximize a feature loss based on the difference while minimizing a target loss function, and wherein the trained first neural network is deployed in a vehicle and executes inference processing for an image captured in the vehicle.

* * * * *